United States Patent
Braniff

(10) Patent No.: US 12,202,216 B2
(45) Date of Patent: Jan. 21, 2025

(54) PATCH MATERIAL

(71) Applicant: SHORT BROTHERS PLC, Belfast (GB)

(72) Inventor: Mark Anthony Braniff, Bangor Down (GB)

(73) Assignee: SHORT BROTHERS PLC, Belfast (GB)

( * ) Notice: Subject to any disclaimer, the term of this patent is extended or adjusted under 35 U.S.C. 154(b) by 0 days.

(21) Appl. No.: 17/767,332

(22) PCT Filed: Oct. 14, 2020

(86) PCT No.: PCT/EP2020/078836
§ 371 (c)(1),
(2) Date: Apr. 7, 2022

(87) PCT Pub. No.: WO2021/074186
PCT Pub. Date: Apr. 22, 2021

(65) Prior Publication Data
US 2022/0371299 A1  Nov. 24, 2022

(30) Foreign Application Priority Data
Oct. 14, 2019  (GB) ...................... 1914827

(51) Int. Cl.
*B32B 41/00*  (2006.01)
*B29C 70/30*  (2006.01)
(Continued)

(52) U.S. Cl.
CPC .............. *B29C 70/38* (2013.01); *B29C 70/30* (2013.01); *B29C 70/545* (2013.01); *B32B 3/14* (2013.01);
(Continued)

(58) Field of Classification Search
CPC ....... B29C 70/38; B29C 70/30; B29C 70/545; B29C 70/08; B32B 3/14; B32B 5/024;
(Continued)

(56) References Cited

U.S. PATENT DOCUMENTS

2008/0289743 A1   11/2008  Tsotsis
2016/0303842 A1*  10/2016  Ponsolle .................. D04H 3/12
2016/0325509 A1*  11/2016  Prebil .................... B29C 70/386

FOREIGN PATENT DOCUMENTS

CN    107476536 A    12/2017
EP      2474410 A1    7/2012
(Continued)

OTHER PUBLICATIONS

International Search Report and Written Opinion in related application PCT/EP2020/078836 mailed Feb. 22, 2021, 15 pages.
(Continued)

*Primary Examiner* — Michael N Orlando
*Assistant Examiner* — Joshel Rivera
(74) *Attorney, Agent, or Firm* — Stinson LLP

(57) ABSTRACT

A material is formed by dividing a fabric into pieces that are substantially parallelogon in shape, the fabric having multiple parallel fibres. The pieces are placed, for example, with a pick and place machine, adjacent to each other on a carrier veil with fibres of adjacent of the pieces in substantial alignment. The pieces are attached to the carrier veil to form the material, the material including the pieces and the carrier veil.

23 Claims, 10 Drawing Sheets

(51) Int. Cl.
*B29C 70/38* (2006.01)
*B29C 70/54* (2006.01)
*B32B 3/14* (2006.01)
*B32B 5/02* (2006.01)
*B32B 5/26* (2006.01)
*B32B 7/03* (2019.01)
*B32B 37/12* (2006.01)
*B32B 37/18* (2006.01)
*B32B 38/00* (2006.01)

(52) U.S. Cl.
CPC ............ *B32B 5/024* (2013.01); *B32B 5/26* (2013.01); *B32B 7/03* (2019.01); *B32B 37/1207* (2013.01); *B32B 37/18* (2013.01); *B32B 38/0004* (2013.01); *B32B 41/00* (2013.01); *B32B 2250/20* (2013.01); *B32B 2305/188* (2013.01)

(58) Field of Classification Search
CPC ......... B32B 5/26; B32B 7/03; B32B 37/1207; B32B 37/18; B32B 38/0004; B32B 41/00; B32B 2250/20; B32B 2305/188; B32B 2262/0261; B32B 2262/0276; B32B 2262/101; B32B 2262/106; B32B 2605/18
See application file for complete search history.

(56) References Cited

FOREIGN PATENT DOCUMENTS

| | | |
|---|---|---|
| EP | 2711170 A1 | 3/2014 |
| EP | 3093130 A1 | 11/2016 |
| EP | 3178342 A1 | 6/2017 |
| GB | 2120599 A | 12/1983 |

OTHER PUBLICATIONS

United Kingdom Search Report and Written Opinion in related application GB1914827.9 mailed Apr. 2, 2020, 4 pages.
Jessyratfink, "How to Sew a Quilt (quilting 101)," webpage, 2011, 52 pages, Instructables Craft. <https://www.instructables.com/How-to-sew-a-quilt-Quilting-101/>.
Cottonpatch Catalog, "Fusibles Glue," product, Aug. 27, 2018, 29 pages, Cottonpatch. <https://web.archive.org/web/20180827050823/https://cottonpatch.co.uk /acatalog/fusibles-glue.html>.
Draus, "First Robotics Competition—Robot bumpers guide," article, 39 pages, Pink Titans Robotics. <https://pinktitansca.weebly.com/uploads/2/5/5/4/25543885/frc-bumpers-handbook.pdf>.
Machine Translation of CN107476536 A, 6 pages.
Examination Report in related EP Application 20820782.9 dated May 4, 2023, 6 pages.

* cited by examiner

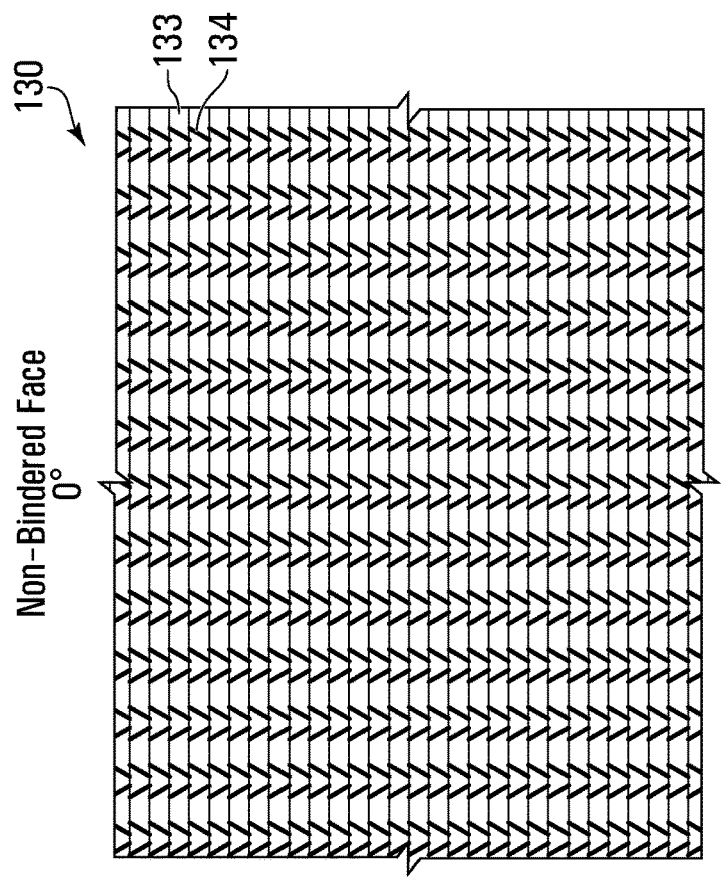
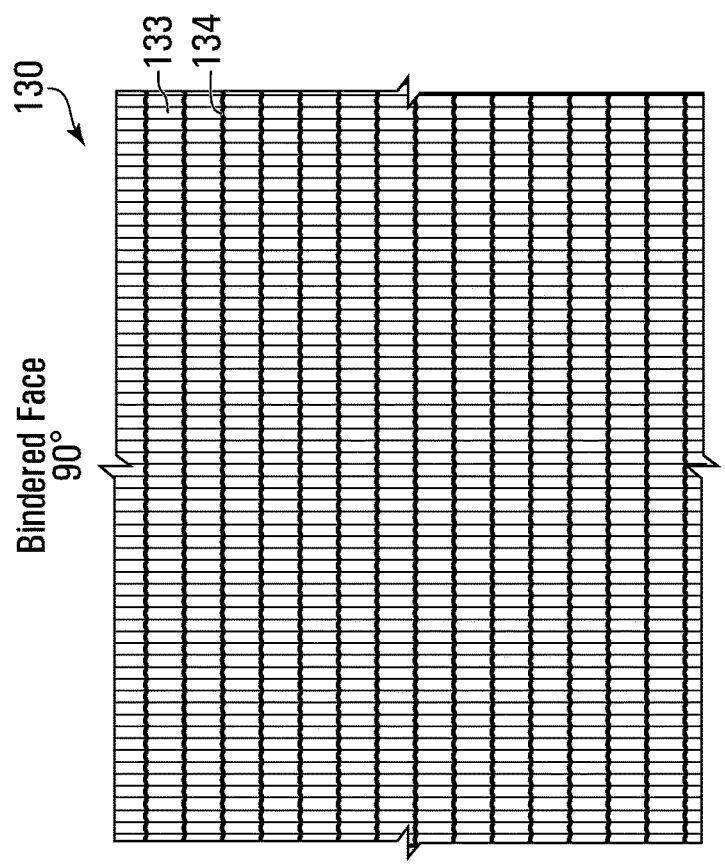

PATCH MATERIAL

RELATED APPLICATIONS

This application is the National Stage of International Patent Application No. PCT/EP2020/078836, filed Oct. 14, 2020, which is hereby incorporated herein by reference in its entirety, and which claims priority to United Kingdom Patent Application No. GB1914827.9, filed Oct. 14, 2019, which is also incorporated herein by reference in its entirety.

FIELD

The present disclosure relates to fabric material and in particular, but not exclusively, to patch fabric material. This application claims priority from UK Patent Application No. GB1914827.9, filed 14 Oct. 2019, the entire contents of which are expressly incorporated herein by reference

BACKGROUND

Fabric material or textiles, such as woven material (formed by weaving) or non-crimp fabric material, can be used in various manufacturing processes. Excess scrap material can result from unused portions of material that are unsuitable for a particular manufactured item or process.

For example, non-crimp fabric, such as a non-crimp carbon fibre, can be used to manufacture composite components for aircraft, such as parts of aircraft wings and horizontal stabilizers. Non-crimp fabric is an expensive material, and conventional manufacturing processes using non-crimp fabric can result in excess fabric going to waste, destined for a landfill.

Traditionally, excess fabric can be recycled to produce a random mat product. Existing techniques for recycling excess dry non-crimp fabric material that has not been impregnated with a matrix material include turning the excess non-crimp fabric material into a fleece, for example, by separating carbon fibres of the excess material and forming a random mat multi-layer carbon fibre fleece. The resulting multi-layer fleece material can have reduced strength as compared to the source non-crimp fabric material.

SUMMARY

According to an aspect, there is provided a method for forming a material, the method comprising: dividing a fabric into pieces that are substantially parallelogon in shape, the fabric having multiple generally parallel fibres; placing the pieces adjacent to each other on a carrier veil with fibres of adjacent of the pieces in substantial alignment; and attaching the pieces to the carrier veil to form the material including the pieces and the carrier veil.

In some embodiments, the fabric is a non-crimp fabric, the fibres are generally straight, and the fibres are arranged in generally parallel bundles.

In some embodiments, the fabric is a woven fabric.

In some embodiments, the dividing comprises cutting the fabric.

In some embodiments, the pieces are of substantially uniform size.

In some embodiments, the method further comprises identifying locations of the pieces prior to the placing and picking the pieces from the locations.

In some embodiments, the method further comprises identifying orientations of the pieces prior to the placing.

In some embodiments, the identifying comprises visually identifying the locations of the pieces.

In some embodiments, the picking comprises a robotic machine picking up the pieces and the placing comprises the robotic machine placing the pieces on the carrier veil.

In some embodiments, the placing comprises placing the pieces to abut each other on the carrier veil.

In some embodiments, the method further comprises discarding a portion of the fabric that does not form a complete parallelogon piece.

In some embodiments, the attaching comprises adhering the pieces to the carrier veil with an adhesive.

In some embodiments, the adhering comprises exposing the adhesive to a temperature of 110 degrees Celsius.

In some embodiments, the placing comprises placing the pieces on the carrier veil in a rotational orientation that is uniform to a rotational orientation of the pieces prior to the placing.

In some embodiments, the placing comprises placing the pieces on the carrier veil having a rotational orientation of fibres of the pieces that is uniform to a rotational orientation of fibres of the pieces prior to the placing.

According to another aspect, there is provided a system for forming a material, comprising: a cutter to cut substantially parallelogon pieces from a fabric having multiple generally parallel fibres; an image sensor to capture image data representing the pieces; a pick and place machine for positioning the pieces on a carrier veil; and a controller in communication with the cutter, the image sensor, and the pick and place machine, the controller operable to: send, to the cutter, instructions to cut the pieces; receive, from the image sensor, the image data representing the pieces; identify a location of the pieces from the image data; and transmit the location of the pieces to the pick and place machine for the pick and place machine to pick up the pieces and position the pieces adjacent each other on the carrier veil with fibres of adjacent of the pieces in substantial alignment.

In some embodiments, the fabric is a non-crimp fabric, the fibres are generally straight, and the fibres are arranged in generally parallel bundles.

In some embodiments, the fabric is a woven fabric.

In some embodiments, the system further comprises a conveyor in communication with the controller for supplying the fabric to the cutter.

In some embodiments, the system further comprises: a heater, in communication with the controller, to generate heat; and a pressurizer, in communication with the controller, to increase pressure, wherein the heater and the pressurizer are configured to apply heat and pressure to an adhesive to adhere the pieces to the carrier veil.

According to another aspect, there is provide a material, comprising: a carrier veil; and pieces of a fabric that are substantially parallelogon in shape and positioned adjacent to each other and adhered to the veil by an application of heat and pressure to activate an adhesive, the pieces cut from a fabric material having multiple parallel fibres, wherein fibres of adjacent of the pieces are in substantial alignment.

In some embodiments, the fabric is a non-crimp fabric, the fibres are generally straight, and the fibres are arranged in generally parallel bundles.

In some embodiments, the fabric is a woven fabric.

In some embodiments, the pieces are of substantially uniform size.

In some embodiments, the pieces are substantially parallelogram in shape.

In some embodiments, the pieces are substantially rectangular in shape.

In some embodiments, the pieces are substantially square in shape.

In some embodiments, the pieces are substantially hexagonal in shape.

In some embodiments, each of the pieces has a length of approximately 100 mm and a width of approximately 100 mm.

In some embodiments, each of the pieces has a length of approximately 50 mm and a width of approximately 50 mm.

In some embodiments, the pieces abut each other.

In some embodiments, the pieces are arranged on the veil in a grid pattern.

In some embodiments, the adhesive is a binder adhered to the fibres of the fabric material.

In some embodiments, the fabric is a dry fabric.

In some embodiments, the fabric comprises at least one of carbon fibres, polyester fibres, nylon fibres, or glass fibres.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

One or more embodiments of the disclosure will now be described, by way of example only, with reference to the accompanying drawings in which:

FIG. 3A illustrates a bindered face of a non-crimp fabric material, in accordance with an embodiment;

FIG. 3B illustrates a non-bindered face of the non-crimp fabric material of FIG. 3A;

DETAILED DESCRIPTION

Systems and methods described herein can divert and repurpose material from landfill by converting waste or excess fabric, such as non-crimp fabric material, onsite into a medium-grade product, which can improve material utilisation, be environmentally friendly and reduce associated costs with disposing of excess waste material.

Fabric such as waste non-crimp fabric material can be formed into a long-fibre discontinuous non-crimp fabric patch material with conventional fibre orientations, such as 0/90° fibre orientation and +/−45° fibre orientation. The non-crimp fabric patch material is formed from patches of non-crimp fabric attached to a carrier veil, as described herein.

A patch material, such as a non-crimp fabric patch material, can exhibit sufficient structural properties, including adequate tensile strength, to handle cutting and layup.

Plies of patch material, such as non-crimp fabric patch material, can be laid up and injected with a matrix material such as resin to form a composite structure. Conveniently, the resulting cured composite structure can have mechanical properties, such as compression, tension, flexural and shear, of 50-70% of a source non-crimp fabric material. In particular, some properties of the resulting composite structure, such as flexural strength, can have 80-85% of original values of a continuous fibre layup formed by a source non-crimp fabric material.

By comparison, a random mat product, made from fleecing a source fabric material, such as non-crimp fabric material, into fibres and producing a random mat multi-layer fleece, would typically exhibit mechanical properties of 20% or more as compared to a source non-crimp fabric material.

Thus, mechanical properties of a composite structure formed of patch material described herein can be less than a composite structure formed from a source fabric material, however, can exceed those of a composite structure formed from a chopped, random mat product, which can have mechanical properties, such as tensile strength, of approximately 20% or more as compared to composite structure formed from the source fabric material.

A composite structure formed of the non-crimp fabric patch material described herein can have a fibre volume ratio, or fibre volume fraction (Vf), of close to 60%, whereby the fibre volume fraction is the percentage of fibre volume in the entire volume of a fibre-reinforced composite material, such as a cured laminate. The remaining volume, for example, 40%, may be occupied by a matrix material such as resin.

The fibre volume fraction of a composite structure formed of the non-crimp fabric materials described herein can be maintained at 55%-63% and allowing an associated thickness control.

Figure 1:
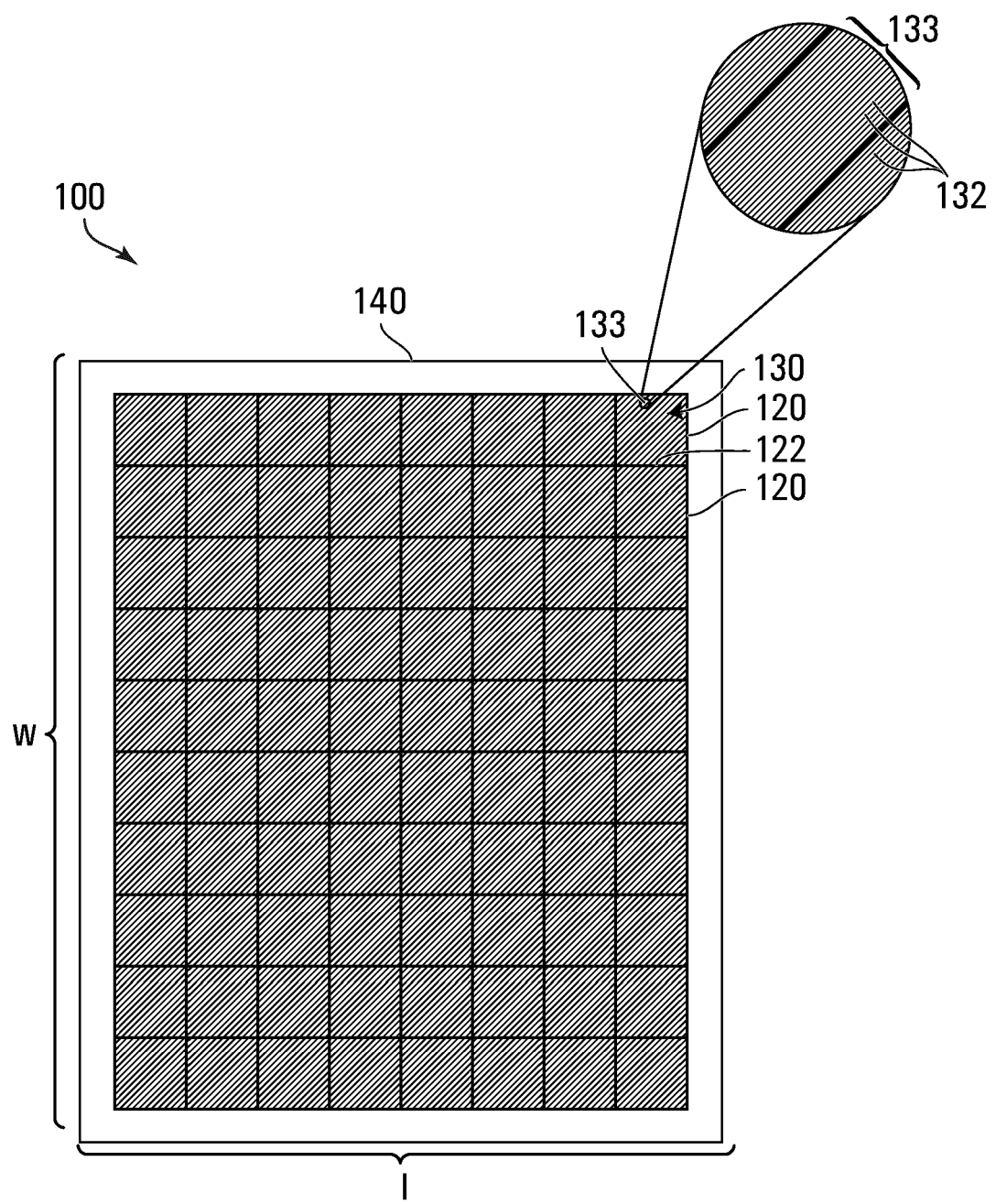
FIG. 1 is a schematic of a non-crimp fabric patch material, in accordance with an embodiment.

FIG. 1 is a schematic of a patch material 100, in an embodiment, a non-crimp fabric patch material, having a width w and a length l. Patch material 100 is formed of adjacent pieces, such as patches 120, of a fabric, such as a non-crimp fabric 130, attached to a carrier material, such as a carrier veil 140. Patches 120 are disposed on carrier veil 140 such that fibres 132, arranged in bundles 133, of non-crimp fabric 130 forming patches 120 are in substantial alignment and discontinuous as between patches 120. An enlarged segment of FIG. 1 illustrates a bundle 133 of multiple adjacent fibres 132.

Patches 120 of fabric may be patches of a non-crimp fabric or a non-crimp carbon fibre, such as non-crimp fabric 130. In some embodiments, patches 120 of fabric may be patches of a woven material, having a weave such as a 5-harness weave, an 8-harness weave, a plain weave, a twill weave, a basket weave, or a uni-weave, or other suitable woven fabric. Patches 120 can be divided from a source non-crimp fabric material 300.

Patch material 100 can be, in an example, 1 meter wide and stored in a roll.

Non-crimp fabric 130 includes one or more yarn layers, each yarn layer consisting of multiple generally straight and generally parallel fibres 132 formed in bundles 133, and one or more yarn layers are secured by stitching 134.

Non-crimp fabric 130 can be uniaxial (fibres 132 are oriented in one direction), biaxial (fibres 132 are oriented in two directions) and multiaxial (fibres 132 are oriented in more than two directions). In some embodiments, orientations of fibres 132 vary across yarn layers.

FIGS. 2A-2D illustrate fibre orientations of non-crimp fabric material 130, in accordance with various embodiments.

Figure 2A:
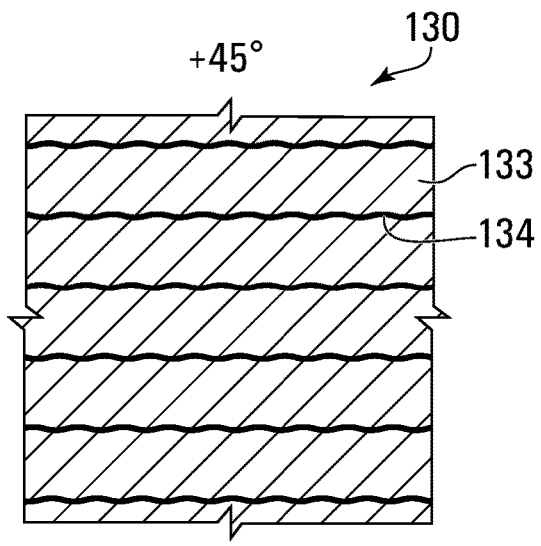
FIGS. 2A-2D illustrate fibre orientations of a non-crimp fabric material, in accordance with various embodiments.

FIG. 2A illustrates a surface of a non-crimp fabric 130 that is biaxial, having bundles 133 of fibres 132 oriented at +45° and −45° (+/−45° fibre orientation), in an example. In particular, a first yarn layer of non-crimp fabric 130 has fibres oriented at +45°, and a second yarn layer has fibres oriented at −45° (not shown). Each layer can have an areal weight of 270 g/m². In an example, a combined areal weight of patch material 100 can be 560 g/m², including non-crimp fabric 130 having two yarn layers having a combined areal weight of 540 g/m², plus an areal weight of the carrier material, such as carrier veil 140, which can have an areal weight of 20 g/m², in an example. Other areal weights are contemplated, based on properties, such as areal weight, of source non-crimp fabric material 300 and carrier veil 140.

Figure 2C:
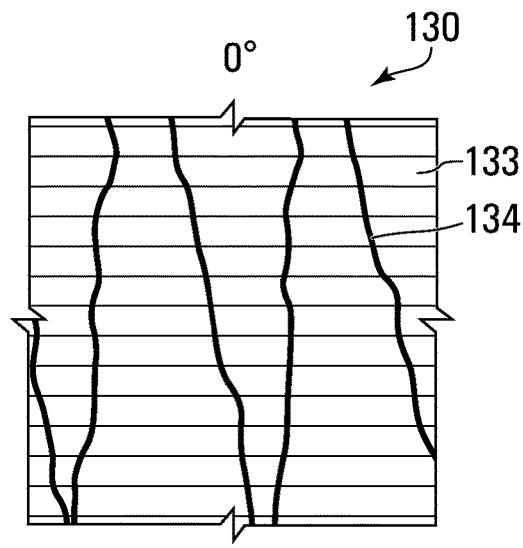
Figure 2B:
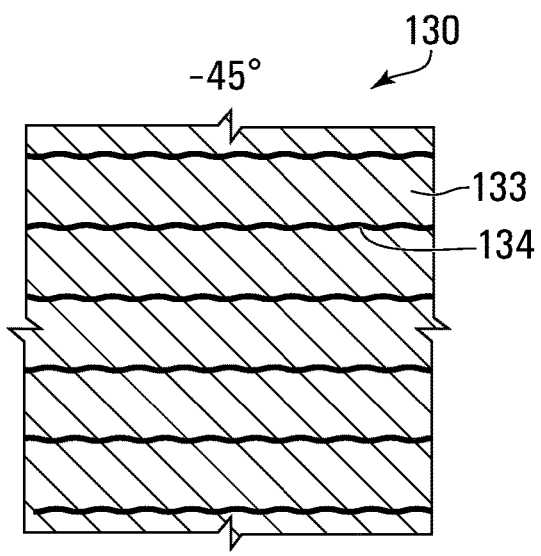

FIG. 2B illustrates a surface of a non-crimp fabric 130 that is biaxial, having bundles 133 of fibres 132 oriented at −45° and +45° (−/+45° fibre orientation). In particular, a first yarn layer of non-crimp fabric 130 has fibres 132 oriented at −45°, and a second yarn layer has fibres oriented at +45° (not shown). Each layer can have an areal weight of 270 g/m².

FIG. 2C illustrates a surface of a non-crimp fabric 130 that is uniaxial, namely a unidirectional (UD) tape, having a single yarn layer of bundles 133 of fibres 132 oriented at 0°, and can have an areal weight of 270 g/m².

Figure 2D:
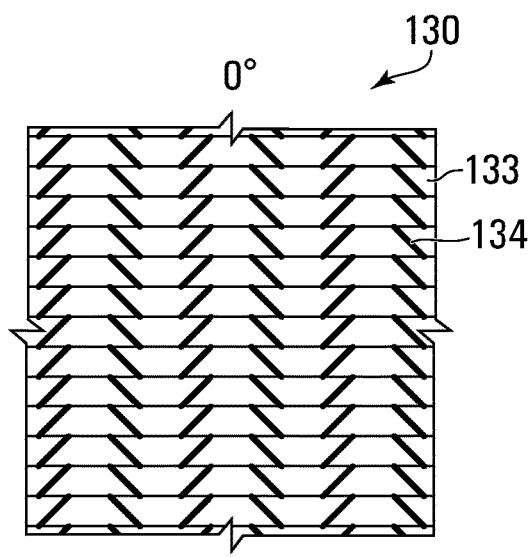

FIG. 2D illustrates a surface of a non-crimp fabric 130 that is biaxial, having bundles 133 of fibres 132 oriented at 0° and 90° (0/90° fibre orientation). In particular, a first yarn layer of non-crimp fabric 130 has fibres 132 oriented at 0°, and a second yarn layer has fibres oriented at 90° (not shown). Each layer can have an areal weight of 270 g/m².

It should be understood that other suitable fibre orientations and areal weights of non-crimp fabric 130 are possible and contemplated.

Fibres 132 can be formed of carbon, glass, aramid, synthetic, hybrid or other suitable material.

Stitching 134, such as small threads, is used to secure fibres 132 in non-crimp fabric 130, for example, in a knitting process to bind one or more layers of fibres 132 together. Stitching 134 can form a warp-knit or weft-knit. Stitching 134 can form a stitch type such as a chain stitch, a tricot stitch, a plain stitch, a satin stitch, or other suitable stitch type. A stitch pattern can be selected to allow some slippage depending on a desired shape of non-crimp fabric 130.

Stitching 134 can be designed to not pinch and crimp fibres 132, resulting in non-crimp fabric 130 being a generally flat product.

Stitching 134 can be formed from a yarn such as polyester, nylon or glass or other suitable material.

In some embodiments, non-crimp fabric 130 is a dry material that is not impregnated with a matrix material or resin.

Conveniently, a dry non-crimp material can have a longer shelf life, and be stored for longer periods of time as compared to a pre-impregnated ("pre-preg") material made of composite fibres (wetted out) with a matrix material, such as a thermoset polymer, epoxy or thermoplastic resin. Pre-preg material, by contrast, begins to react once it is removed from refrigerated storage and cut. Furthermore, pre-preg material attached to a carrier material (without resin) can result in resin being absorbed into the carrier material, which could compromise a quality of a final product, and due to the thickness of the material involved, the flow of resin distribution can be difficult during subsequent processing.

In some embodiments, non-crimp fabric 130 includes an adhesive such as a binder 136 on a surface of non-crimp fabric 130 that is used to attach patches 120 of non-crimp fabric 130 to carrier veil 140 by adhering patches 120 to carrier veil 140.

FIG. 3A illustrates an example of a bindered face of non-crimp fabric material 130 that is biaxial, having fibres 132 oriented at a first yarn layer of 90° (the bindered surface) and a second yarn layer 0° (90/0° fibre orientation). FIG. 3B illustrates a corresponding non-bindered face on the second yarn layer of the non-crimp fabric material 130 of FIG. 3A.

Binder 136 can include particles of thermoplastic binder adhered to underlying fibres 132. The thermoplastic can be reactivated upon application of heat and/or pressure to generate adhesion.

Binder 136 can be disposed, by way of heat and pressure, on fibres 132 at 20 g/m², or other suitable areal weight. In some embodiments, binder 136 is already present on source non-crimp fabric material 300 during manufacturing of source non-crimp fabric material 300.

Each of patches 120 have fibres 132 that are directionally aligned, and in particular, having multiple generally straight and generally parallel fibres 132 and bundles 133 of fibres 132.

Patches 120 are divided, in an example, cut, from a source non-crimp fabric material 300. Source non-crimp fabric material 300 can be 1.6 meters wide and 100 meters long and stored in a roll, and having multiple generally straight and generally parallel bundles 133 of fibres 132. It is contemplated that other sizes of source non-crimp fabric material may be used.

Patches 120 of non-crimp fabric 130 can be substantially parallelogon in shape. A parallelogon can be defined as a polygon whereby images of the polygon can tile a plane when fitted together along entire sides, without rotation. Such a parallelogon has an even number of sides and opposite sides that are generally equal in length and generally parallel.

In some embodiments, patches 120 are substantially parallelogram, namely, a four-sided parallelogon, in shape. For example, patches 120 can be substantially rectangular in shape. In some embodiments, patches 120 are substantially square in shape.

In some embodiments, patches 120 can be substantially quadrilateral in shape. In some embodiments, patches 120 can be substantially hexagonal in shape. A substantially hexagonal shape of patches 120 can break up joint discontinuities, such as joints 122 described below, defined between patches 120.

Other shapes of patches 120 are contemplated, such as a chevron shape, or other suitable shape for attaching to carrier veil 140.

A shape of patches 120, such as square, may be selected to allow patches 120 to abut each other tightly on carrier veil 140, as it can be desirable to achieve minimum gap and zero overlap between patches 120.

In some embodiments, patches 120 can be sized approximately between 45 mm and 300 mm long and approximately between 45 mm and 300 mm wide, in an example, approximately 100 mm long and approximately 100 mm wide, in another example, approximately 75 mm long and approximately 75 mm wide, and in a further example, approximately 50 mm long and approximately 50 mm wide.

Sizing of patches 120 may be selected based on a maximum utilisation balanced with what can be practically cut and placed. For example, smaller patch sizes can require additional pick and place processing time and mechanical performance can be impacted, however, smaller patch sizes may allow for greater utilization of source non-crimp fabric material 300, for example, excess material that may not have another suitable use.

In some embodiments, patches 120 are substantially uniform in shape and size, and in other embodiments shapes are non-uniform in shape and size.

Patches 120 are disposed in a layout configuration on carrier veil 140.

In some embodiments, patches 120 are arranged in columns along width w of patch material 100 and rows along length l of patch material 100.

In some embodiments, patches 120 abut each other. Joints 122 can be defined between patches 120 where fibres 132 are discontinuous.

A layout of patches 120 on carrier veil 140 can form a two-dimensional grid pattern of patches 120, formed of rows and columns, on carrier veil 140. In some embodiments, alignment of patches 120 on carrier veil 140, for example, by rows and/or columns, can be offset from each other. In an example, a layout of patches 120 can form a staggered brick wall pattern.

In some embodiments, the rotational orientation of patches 120 disposed on carrier veil 140 is uniform to that of patches 120 extracted from a source non-crimp fabric material 300 and prior to placing on carrier veil 140.

In some embodiments, the rotational orientation of fibres 132 of patches 120 disposed on carrier veil 140 is uniform to the rotational orientation of fibres 132 in source non-crimp fabric material 300 from which patches 120 are extracted.

In some embodiments, there is substantial alignment of fibres 132 between columns of patches 120, and in some embodiments there is substantial alignment of fibres 132 only along columns of patches 120. In some embodiments, there can be both alignment of fibres 132 between and along columns of patches 120.

Similarly, in some embodiments, there is substantial alignment of fibres 132 between rows of patches 120, and in some embodiments there is substantial alignment of fibres 132 only along rows of patches 120. In some embodiments, there can be both alignment of fibres 132 between and along rows of patches 120.

The alignment of fibres 132 in patches 120 of patch material 100 can be within +/−3 degrees of the orientation of fibres 132 in other patches 120 attached to carrier veil 140.

Patch material 100 also includes a carrier material, such as carrier veil 140, to which patches 120 are attached, for example, tacked or adhered. Carrier veil 140 forms part of the final patch material 100, and as such, does not need to be peeled off for use of patch material 100.

In some embodiments, patches 120 can be attached to carrier veil 140 with stitching.

Carrier veil 140 can be a supporting low areal weight random mat carrier. In some embodiments, carrier veil 140 has an areal weight between 10 g/m$^2$ and 20 g/m$^2$. Carrier veil 140 can have an areal weight of 100 g/m$^2$, and in some embodiments, an areal weight of 2 g/m$^2$, or other suitable areal weight.

Carrier veil 140 can be a few thousands of an inch thick.

In some embodiments, carrier veil 140 includes an adhesive to facilitate tacking and to which patches 120 adhere, and can be tackified, having an adhesive disposed thereon.

In some embodiments, carrier veil 140 is an adhesive carrier, which provides support or carrier for adhesive films. Thus, a compatible adhesive or resin is applied to carrier veil 140, to which patches 120 can then adhere. An example adhesive or resin is a Cycom™ 890 resin, in the form of a 20 g/m$^2$ film.

In some embodiments, patches 120 adhere to carrier veil 140 by way of an adhesive component on patches 120, and carrier veil 140 does not include adhesive material.

Carrier veil 140 can reinforce the structure of patch material 100.

Carrier veil 140 can be formed of material including carbon, glass, polyester, or other suitable material.

In some embodiments, carrier veil 140 includes at least one of carbon fibres, or glass fibres. In some embodiments, carrier veil 140 includes a recycled material.

In some embodiments, carrier veil 140 can be formed by a thermoplastic material, such as a polymer, which can improve the toughness of a composite structure (such as a cured laminate structure) formed of non-crimp fabric 130 and carrier veil 140. In particular, a thermoplastic carrier veil 140 can improve interlaminar shear strength, or resistance against delamination, of such a composite structure.

Multiple layers or plies of patch material 100 can be nested, extracted and assembled to create a composite structure once impregnated with resin.

To form a composite structure, layers of patch material 100 are layered onto one another in a layup, for example, with a predetermined orientation. In an example, multiple layers of patch material 100 can be staggered 10 mm or 20 mm, avoiding overlap in joints 122. A matrix material, such is resin, is introduced into the layers of patch material 100 and cured.

Conveniently, the resulting composite structure can have improved mechanical properties over a composite structure formed from a chopped, random mat product made from fleecing source non-crimp fabric material 300.

Load transfer in patch material 100 can occur around fibre 132 discontinuities, namely, at joints 122 between patches 120. However, in some embodiments, joints 122 between patches 120 are not aligned as between layers of patch material 100 in a composite structure, provided layers of patch material 100 are not stacked with the joints aligned, which is unlikely due to nest complexity of a layup.

Furthermore, the presence of joints 122 in patch material 100, where fibres 132 are discontinuous, can conveniently contain damage such as a crack formed in the composite structure.

In some embodiments, different square footprint geometries of patches 120 can be employed for specific material types to avoid alignment of joints within a layup stack of patch material 100. By way of non-limiting example, patches 120 having 0/90° fibre orientation can be 75 mm$^2$ in size; patches 120 having +/−45° fibre orientation can be 70 mm$^2$ in size; and patches 120 having −/+45° fibre orientation can be 80 mm$^2$ in size.

Figure 4:
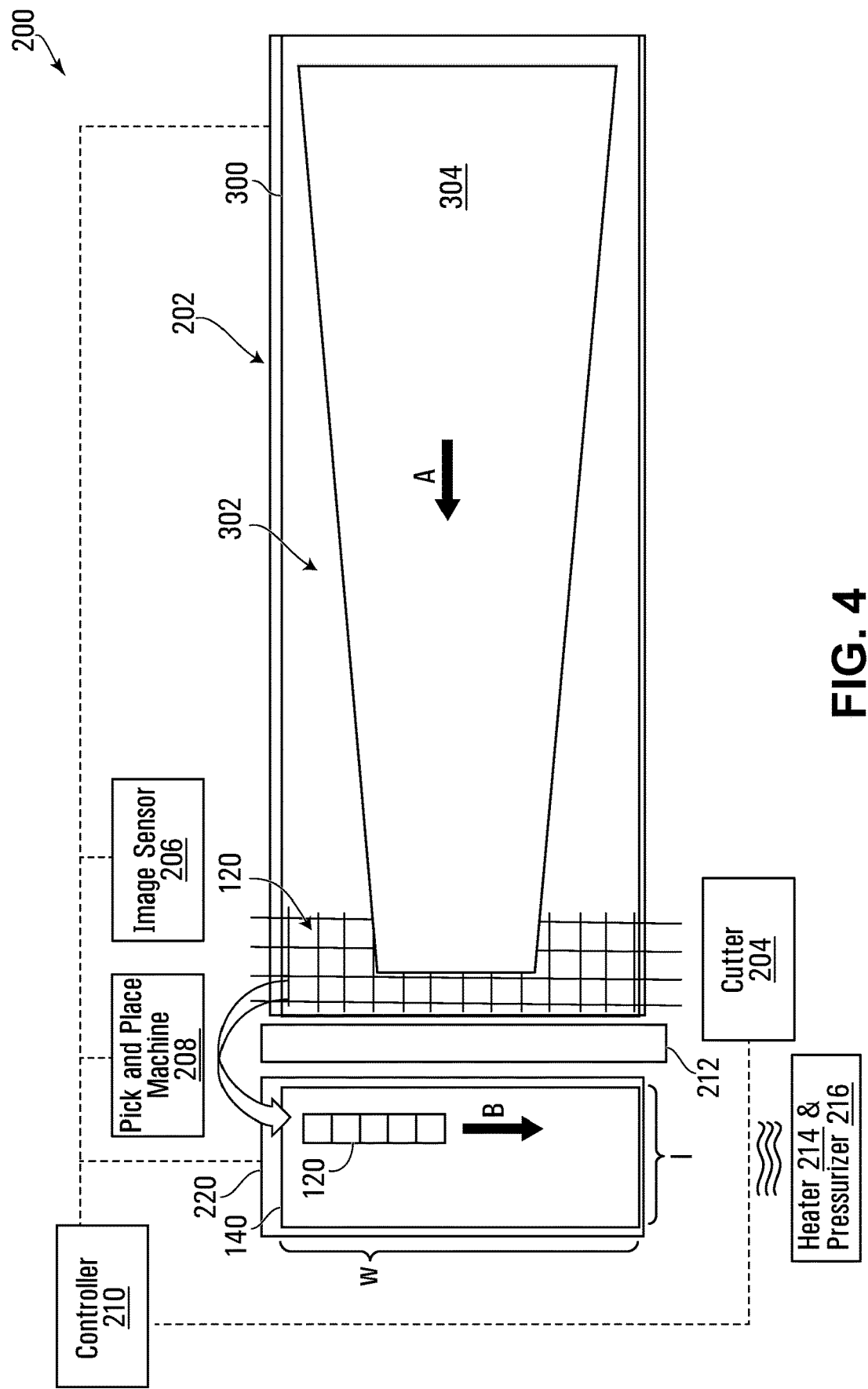
FIG. 4 is a schematic of a system for forming a non-crimp fabric patch material, in accordance with an embodiment.

FIG. 4 is a schematic of a system 200 for forming a patch material 100, such as a non-crimp fabric patch material, in accordance with an embodiment.

As illustrated by way of example in FIG. 4, system 200 includes a controller 210 in communication with a material conveyor 202, a cutter 204, an image sensor 206, a pick and place machine 208, a heater 214, a pressurizer 216, and a veil conveyor 220.

System 200 can be integrated into an existing composite cutting cell.

Figure 5:
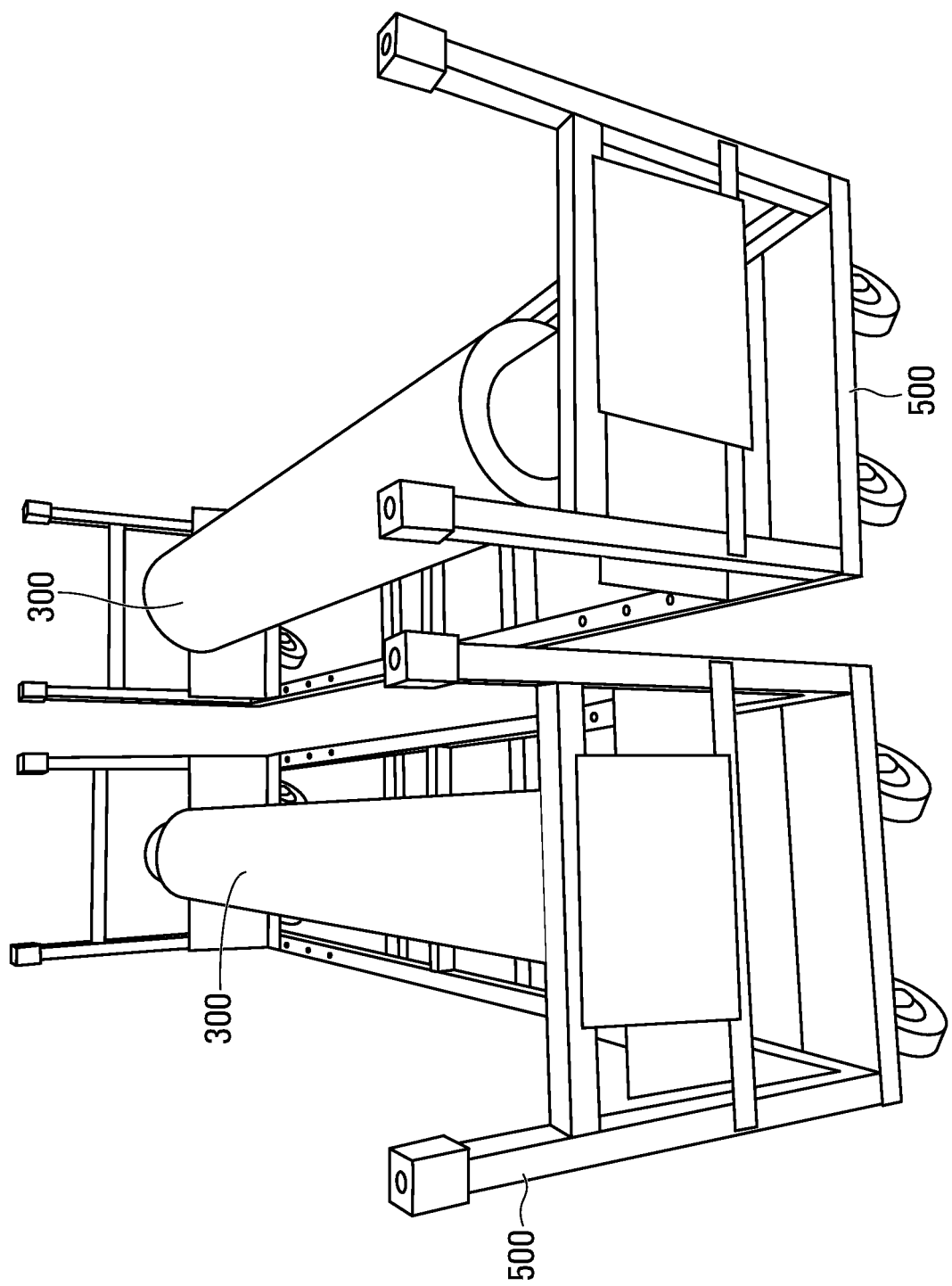
FIG. 5 illustrates storage of a source non-crimp fabric material in an operating environment of the system of FIG. 4, in accordance with an embodiment.

In an operating environment of system 200, source non-crimp fabric material 300 can be stored in a roll on a dedicated transport media, such as a trolley 500, as shown in FIG. 5. A roll of source non-crimp fabric material 300 can be 1.6 meters wide and 100 meters long.

Figure 6:
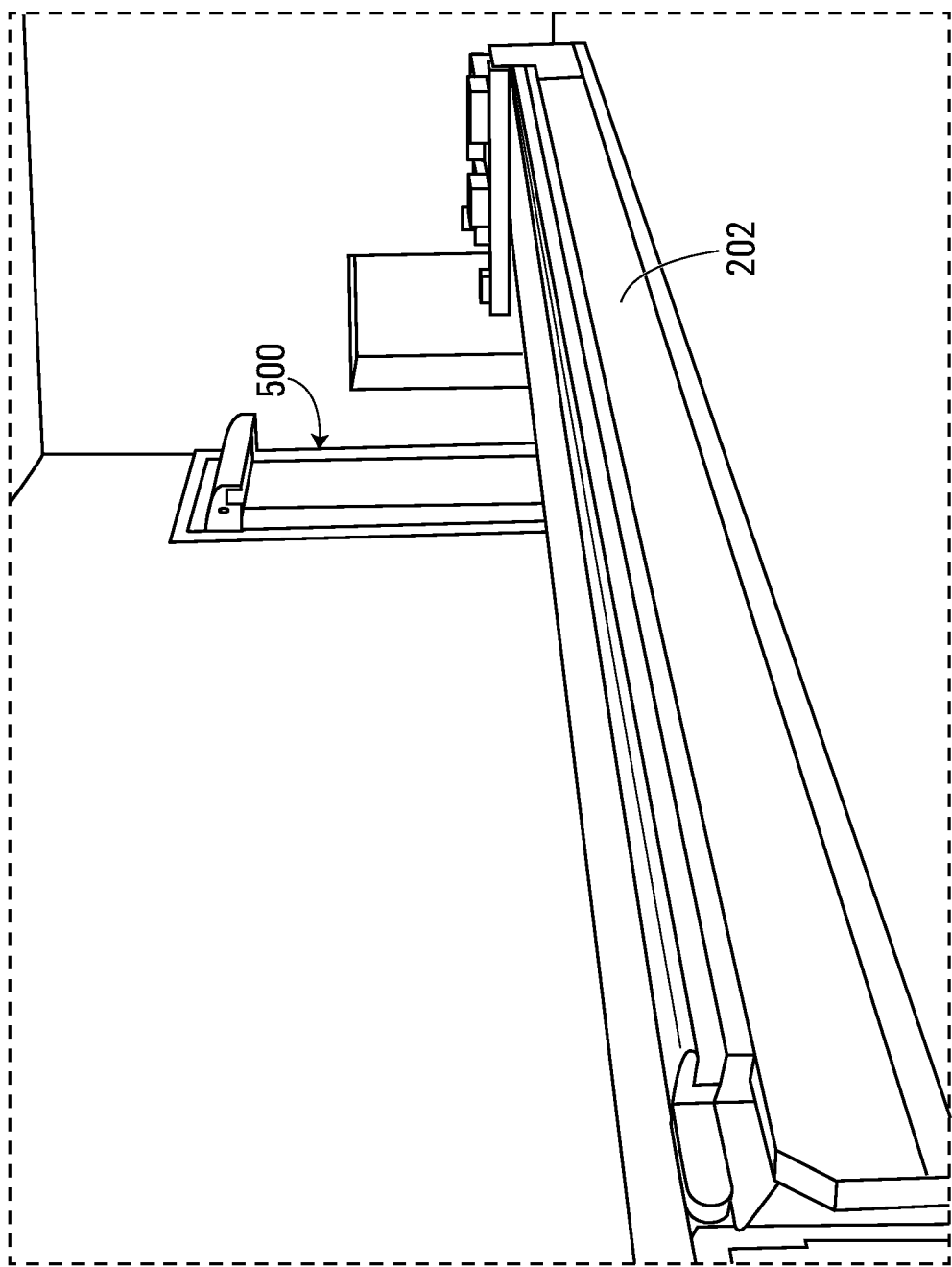
FIG. 6 illustrates an operating environment of the system of FIG. 4, in accordance with an embodiment.

Trolleys 500 containing source non-crimp fabric material 300 can be stored in a material store 600 as shown in FIG. 6.

Material conveyor 202 can be a roller bed belt conveyor or other suitable conveyance system, and include drive pulleys, driven, for example, by motors, at each end to actuate a belt over a roller bed.

Material conveyor 202 can be in communication with controller 210 for supplying source non-crimp fabric material 300 to cutter 204 in a direction A, as illustrated in FIG. 4.

Cutter 204 can be used to divide, for example, by way of cutting, pieces of source non-crimp fabric material 300. Cutting can be performed in a roll direction (zero direction) of source non-crimp fabric material 300.

Cutter 204 cuts ply shape 304 through nesting or computer-aided manufacturing (CAM) software incorporated into controller 210, or a separate computing device.

Ply shape 304 can be suitable for use as various aircraft components, in an example, a wing skin.

Cutting of ply shape 304 leaves a periphery of excess material 302 that, in some embodiments, is not suitable to be employed, for example, in a wing skin build. Ply shape 304 is separated from excess material 302 by a ply boundary 303.

Cutter 204 is further configured to cut patches 120 from excess material 302.

Cutter 204 can be a fabric cutter such as a steel rule die cutting system including a die punch, ultrasonic knife technology, or other suitable cutting mechanism.

One or more portions of excess material 302, for example, non-uniform pieces that do not form a complete parallelogon or parallelogrammatic piece such as patches 120, can be discarded and fall into a scrap bin 212 as advanced by material conveyor 202.

Figure 7:
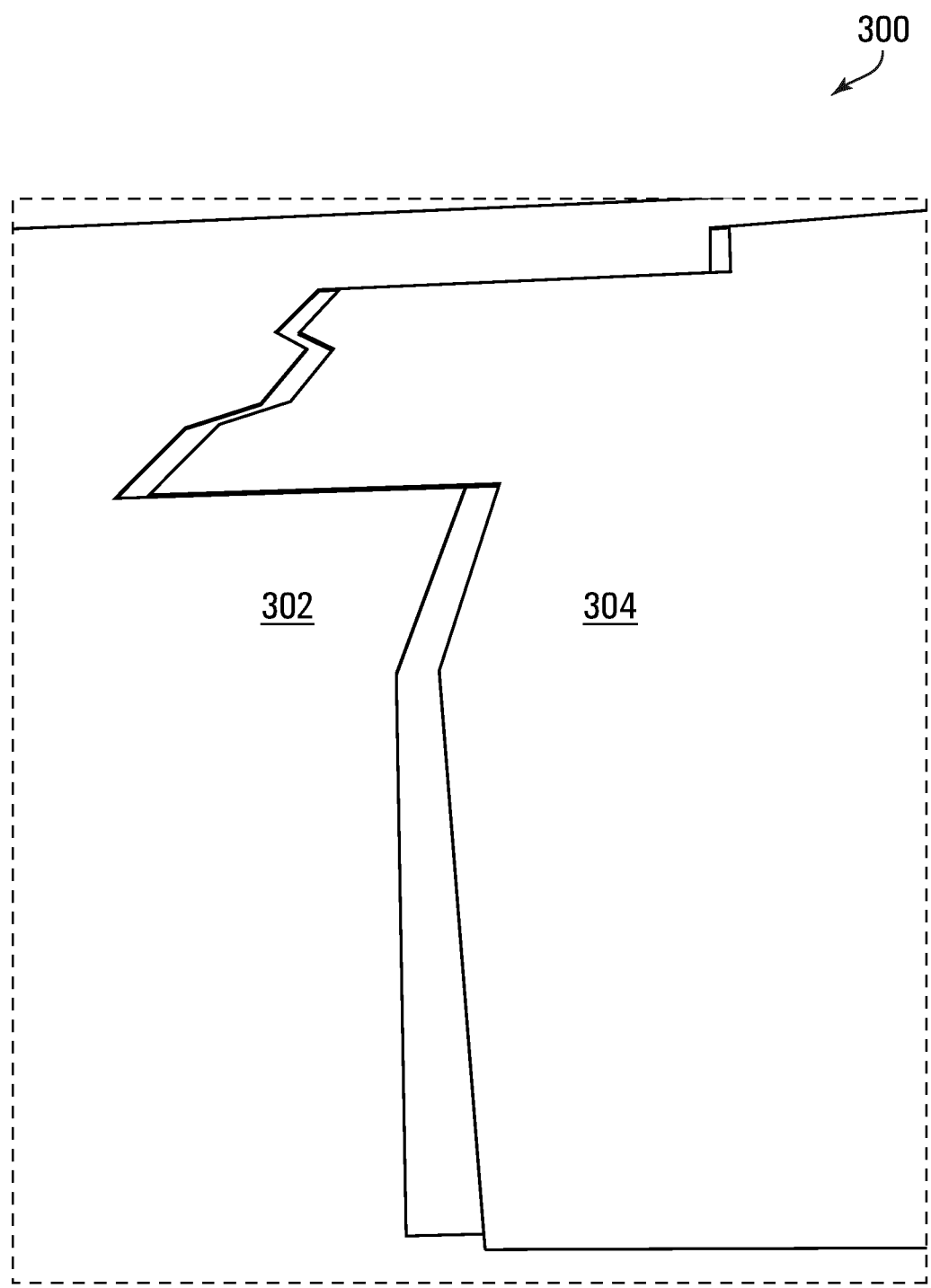
FIG. 7 is a front perspective view of a cut source non-crimp fabric material, in accordance with an embodiment.

FIG. 7 is a front perspective view of source non-crimp fabric material 300, cut into excess material 302 and ply shape 304, in accordance with an embodiment.

System 200 can further include image sensor 206, as part of a vision system in communication with controller 210.

Image sensor 206, in conjunction with controller 210, visually recognizes cut patches 120 to identify a location of patches 120, for use by pick and place machine 208.

Location of patches 120 can also be calculated from CAM software, for example, incorporated in controller 210, based on cutting locations performed by cutter 204.

System 200 also includes a robotic machine such as a pick and place machine 208.

Pick and place machine 208 grasps patches 120, removing patches 120 from material conveyor 202, and places patches 120, for example, adjacent and side by side, onto carrier veil 140.

Pick and place machine 208 can include a fully articulated (multiple axis) robot, a Selective Compliant Axis Robotic Arm (SCARA) robot, a parallel axis (Delta or "spider") robot, or other suitable robotics.

Figure 8:
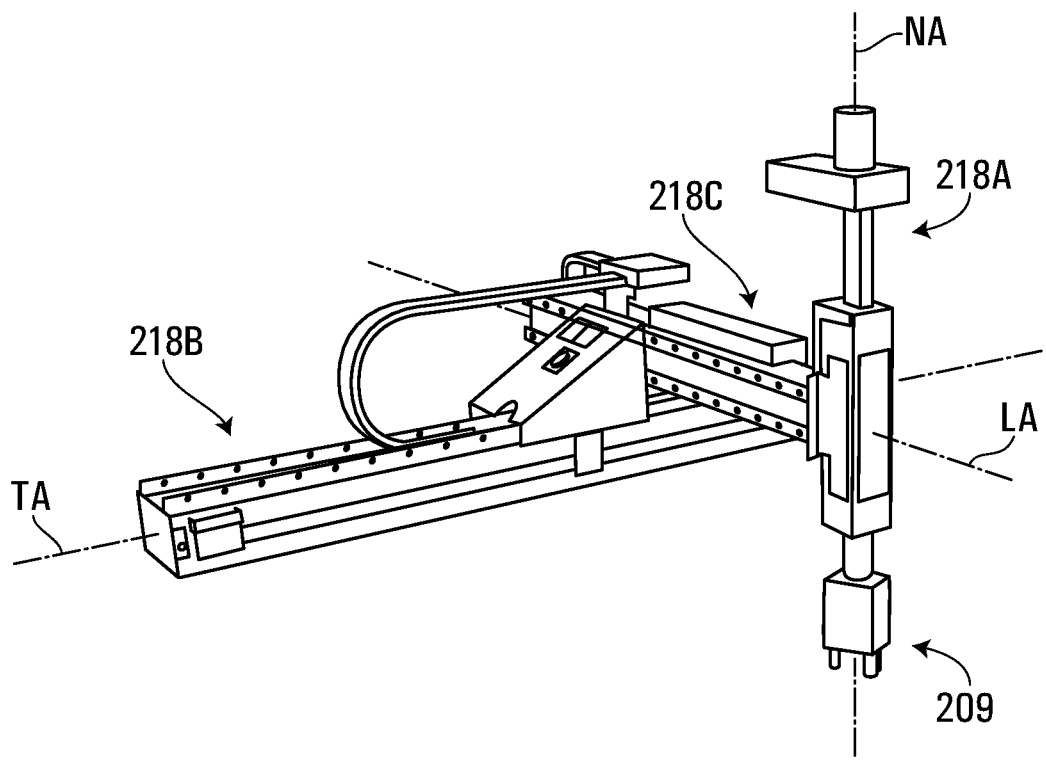
FIG. 8 is a schematic perspective view of a pick and place machine, in accordance with an embodiment.

FIG. 8 illustrates an example pick and place machine 208. Pick and place machine 208 can have a vacuum or squeeze type end or arm tool 209, used to grasp and pick up patches 120.

As illustrated in FIG. 8, in some embodiments pick and place machine 208 has a first arm 218A, a second arm 218B, and a third arm 218C providing three degrees of movement for arm tool 209 along a normal axis NA, a transverse axis TA and a longitudinal axis LA, respectively and in an example, by way of linear motors.

In some embodiments, a vision system (such as image sensor 206 in combination with controller 210), CAM software, or line tracking, or a combination of thereof, can be used to identify pick points as locations to pick up patches 120 once cut by cutter 204 from excess material 302.

Pick and place machine 208 can then actuate along one or more of first arm 218A, second arm 218B and third arm 218C to translate patch 120 to a location on carrier veil 140. The location on carrier veil 140 can be determined based on logic at controller 120, for example, CAM software, and can be determined in conjunction with a vision system such as image sensor 206 to form a layout of patches 120, such as those described herein.

Pick and place machine 208 can translate patches 120 onto carrier veil 140. In some embodiments, patches 120 are placed on carrier veil 140 in a rotational orientation that is uniform to that of patches 120 extracted from a source non-crimp fabric material 300 and prior to placing on carrier veil 140.

In some embodiments, patches 120 are placed on carrier veil 140 in a rotational orientation of fibres 132 of patches 120 disposed on carrier veil 140 is uniform to the rotational orientation of fibres 132 in source non-crimp fabric material 300 from which patches 120 are extracted.

In some embodiments, pick and place machine 208 can rotate patches 120 prior to placing patches 120 on carrier veil 140, for example, to align fibres 132.

As illustrated in FIG. 4, in some embodiments, patches 120 are placed adjacent to each other and abutting each other on carrier veil 140, in a direction B, in an example, column by column.

Patches 120 can be placed by pick and place machine 208 in a layout on carrier veil 140 as described herein.

Pick and place machine 208 may place patches 120 on carrier veil 140 to achieve minimum gap and zero overlap between patches 120.

Figure 9:
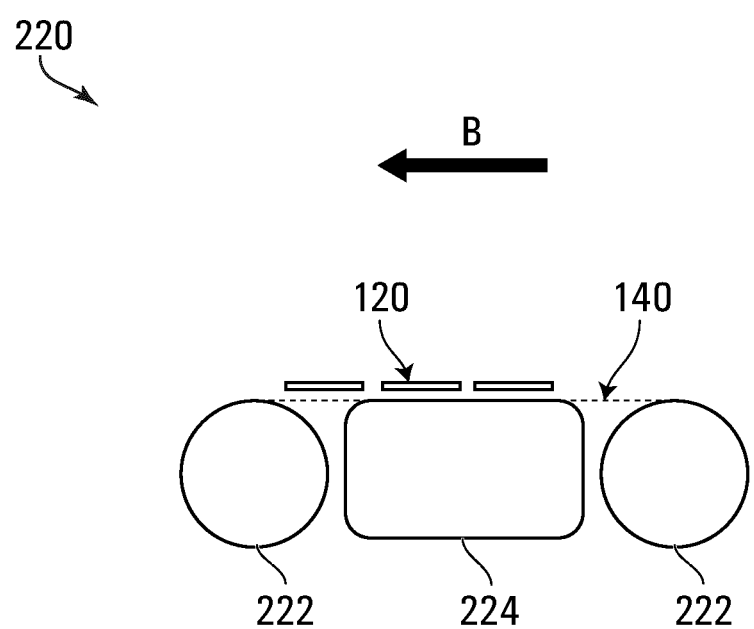
FIG. 9 is a schematic side view of a conveyor, in accordance with an embodiment.

In some embodiments system 200 can include a veil conveyor 220, such as a belt drive, to move carrier veil 140 in direction B as patches 120 are placed. An example veil conveyor 220 is shown in FIG. 9.

Veil conveyor 220 includes drive pulleys 222 to actuate a belt (not shown) over roller bed 224.

In some embodiments, veil conveyor 220 can be generally identical in structure and components to material conveyor 202 as described herein.

System 200 can also include heater 214 and pressurizer 216 configured to tack patches 120 to carrier veil 140 using heat and pressure generated by heater 214 and pressurizer 216, to form patch material 100.

Binder 136 on surface of patches 120 of non-crimp fabric 130 can be activated at 110 degrees Celsius with one bar of gauge pressure applied, whereby gauge pressure is zero-referenced against ambient pressure.

In some embodiments, heater 214 and pressurizer 216 are incorporated in a single device, such as a heated iron.

In some embodiments, an adhesive such as binder 136 can be activated by heater 214 and/or pressurizer 216 just before patch 120 is applied to carrier veil 140 by pick and place machine 208.

In some embodiments, an adhesive such as binder 136 can be activated by heater 214 and/or pressurizer 216 once one or more patches 120 are placed on carrier veil 140 by pick and place machine 208.

Controller 210 can be a suitable computing device configured, under software control, to facilitate the operation of components of system 200.

Software components stored within a memory of controller 210 can include nesting or computer-aided manufacturing (CAM) software, such as JETCAM™ software, or other suitable control software.

Controller 210 is in communication with material conveyor 202, cutter 204, image sensor 206, pick and place machine 208, heater 214, pressurizer 216, and veil conveyor 220.

Controller 210 can operate in combination with material conveyor 202 to instruct material conveyor 202 advance source non-crimp fabric material 300 towards cutter 204.

Controller 210 can operate in combination with cutter 204 to instruct cutter 204 cut source non-crimp fabric material 300.

Controller 210 can operate in combination with image sensor 206 to receive image data from image sensor 206 to locate cut patches 120 from excess material 302.

Controller 210 can operate in combination with pick and place machine 208 to instruct pick and place machine 208 to pick up patches 120 cut from excess material 302 and place patches 120 on carrier veil 140.

Controller 210 can operate in combination with veil conveyor 220 to instruct veil conveyor 220 to advance carrier veil 140 as patches 120 are placed on carrier veil 140.

Controller 210 can operate in combination with heater 214 and pressurizer 216 to activate an adhesive to tack patches 120 to carrier veil 140.

In an example, system 200, in conjunction with controller 210, operates to cut ply shape 304 from a source non-crimp fabric material 300 having +/−45° fibre orientation, using cutter 204, and to cut 100 mm² patches 120 from excess material 302. Image sensor 206 operates to visually identify locations of patches 120. Pick and place machine 208 picks up patches 120 and places patches 120 on carrier veil 140, without rotating patches 120, thus maintaining +/−45° fibre orientation. Heater 214 and pressurizer 216 operate to apply heat and pressure to patches 120 and carrier veil 140 to adhere patches 120 to carrier veil 140. Thus, patch material 100 is formed, having +/−45° fibre orientation.

Figure 10:
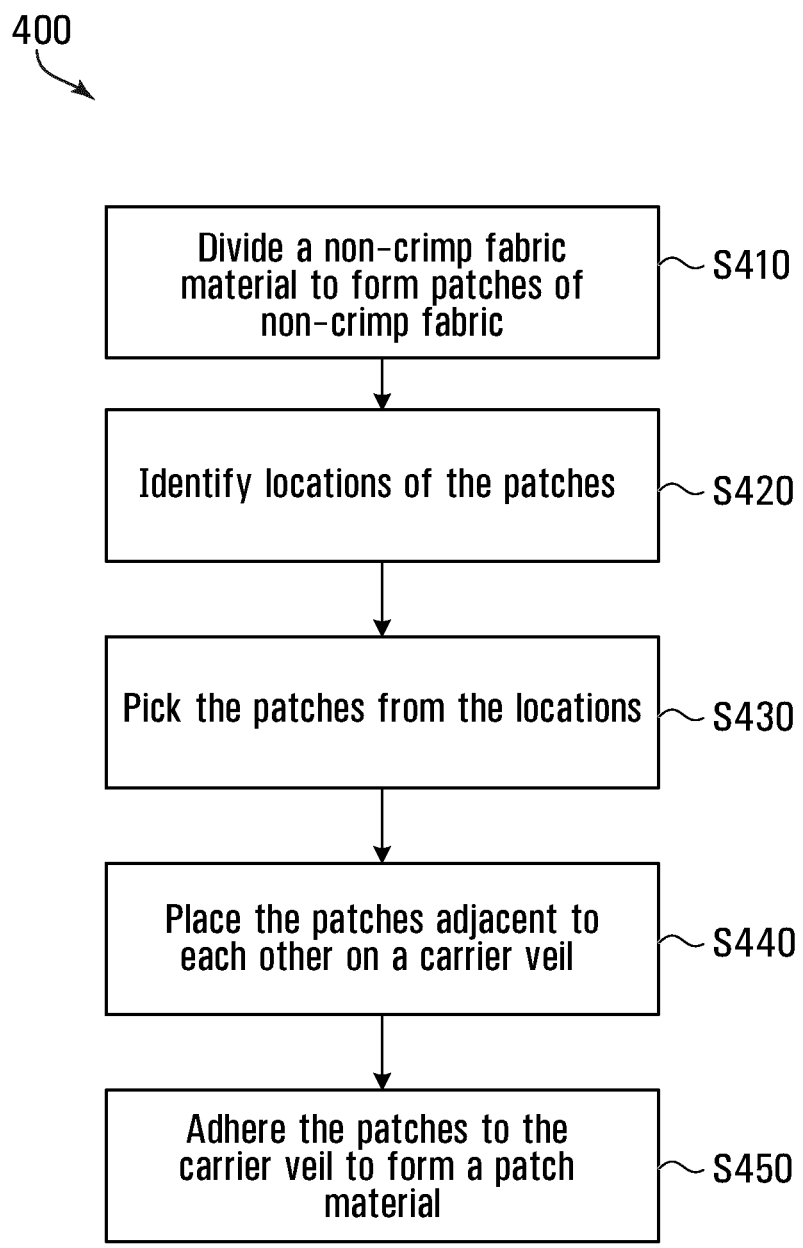
FIG. 10 is a flow diagram of an example method for forming a non-crimp fabric patch material, in accordance with an embodiment.

FIG. 10 illustrates a flow chart of a method 400 for forming a patch material 100, such as a non-crimp fabric patch material, performed by components of system 200, according to an embodiment. In some embodiments, steps are performed in conjunction with software control by controller 210. The blocks are provided for illustrative purposes. Variations of the blocks, omission or substitution of various blocks, or additional blocks can be considered.

At block S410, cutter 204 operates to divide, by cutting, source non-crimp fabric material 300 to form patches 120 of non-crimp fabric 130, in an example, in square shapes.

At block S420, image sensor 206, in communication with controller 210, identifies locations of patches 120.

At block S430, pick and place machine 208 operates to pick up patches 120 from the locations.

At block S440, pick and place machine 208 operates to place patches 120 adjacent to each other on carrier veil 140 to orient fibres of adjacent patches 120 in substantial directional alignment and discontinuity.

At block S450, heater 214 and pressurizer 216 operate to generate heat and pressure to attach patches 120 to carrier veil 140 to form a material, namely patch material 100. Patch material 100 includes patches 120 and carrier veil 140.

It should be understood that the blocks can be performed in a different sequence or in an interleaved or iterative manner.

Material described herein, such as patch material 100, such as non-crimp fabric patch material, and composite structures (such as cured laminates) formed from patch material 100, can be suitable for semi-structural application, for example, a composite tooling application such as in-house tooling applications, as well as automotive bodywork and semi-structural chassis components, marine applications such as hulls and superstructure, wing turbine blades such as aerodynamic surface skins, and sporting goods, in particular, those where lightweight and stiffness are desirable characteristics over outright strength.

Thus, creation of patch material 100 can address a market for less costly materials, for example, for semi-structural or non-structural parts. In an example, patch material 100 can be suitable for mass transit train bodies and internal light weight structures.

Patch material 100 can be fully traceable to the source fibre manufacturer of source non-crimp fabric material 300. For example, source non-crimp fabric material 300 can be fully traceable through certificates of conformance issued for each batch of material produced by the supplier, with source non-crimp fabric material 300 having a bar-coded batch number associated with the original equipment manufacturer (OEM). The bar-coded batch number can be transferred to patch material 100 as it is manufactured, which can include multiple batches within a roll of patch material 100. The OEM batch number can allow for full traceability back to the source non-crimp fabric material 300 and associated fibre and test data.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A method for forming a material, the method comprising:
    dividing a fabric into pieces that are substantially parallelogon in shape, the fabric having multiple generally parallel fibres;
    placing the pieces adjacent to each other on a carrier veil with fibres of adjacent pieces in substantial alignment such that the pieces tile a plane in first rows of pieces extending parallel to a first axis and second rows of pieces extending parallel to a second axis transverse to the first axis; and
    attaching the pieces to the carrier veil to form the material including the pieces and the carrier veil.

2. The method of claim 1, wherein the fabric is a non-crimp fabric, the fibres are generally straight, and the fibres are arranged in generally parallel bundles, or wherein the fabric is a woven fabric.

3. The method of claim 1, wherein the dividing comprises cutting the fabric.

4. The method of claim 1, wherein the pieces are of substantially uniform size.

5. The method of claim 1, further comprising identifying locations of the pieces prior to the placing and picking the pieces from the locations.

6. The method of claim 5, wherein the picking comprises a robotic machine picking up the pieces and the placing comprises the robotic machine placing the pieces on the carrier veil.

7. The method of claim 1, wherein the placing comprises placing the pieces to abut each other on the carrier veil.

8. The method of claim 1, further comprising discarding a portion of the fabric that does not form a complete parallelogon piece.

9. The method of claim 1, wherein the attaching comprises adhering the pieces to the carrier veil with an adhesive.

10. The method of claim 1, wherein the placing comprises placing the pieces on the carrier veil in a rotational orientation that is uniform to a rotational orientation of the pieces prior to the placing.

11. A system for forming a material in accordance with the method of claim 1, comprising:
a cutter to cut the substantially parallelogon pieces from the fabric having multiple generally parallel fibres;
an image sensor to capture image data representing the pieces;
a pick and place machine for positioning the pieces on the carrier veil; and
a controller in communication with the cutter, the image sensor, and the pick and place machine, the controller operable to:
send, to the cutter, instructions to cut the pieces;
receive, from the image sensor, the image data representing the pieces;
identify a location of the pieces from the image data; and
transmit the location of the pieces to the pick and place machine for the pick and place machine to pick up the pieces and position the pieces adjacent each other on the carrier veil with fibres of adjacent of the pieces in substantial alignment.

12. The system of claim 11, wherein the fabric is a non-crimp fabric, the fibres are generally straight, and the fibres are arranged in generally parallel bundles, or wherein the fabric is a woven fabric.

13. The system of claim 11, further comprising a conveyor in communication with the controller for supplying the fabric to the cutter.

14. The system of claim 11, further comprising:
a heater, in communication with the controller, to generate heat; and
a pressurizer, in communication with the controller, to increase pressure,
wherein the heater and the pressurizer are configured to apply heat and pressure to an adhesive to adhere the pieces to the carrier veil.

15. A material formed in accordance with the method of claim 1, comprising:
the carrier veil; and
the pieces of a fabric that are substantially parallelogon in shape and positioned adjacent to each other and adhered to the veil by an application of heat and pressure to activate an adhesive, the pieces cut from a fabric material having multiple parallel fibres,
wherein fibres of adjacent of the pieces are in substantial alignment.

16. The material of claim 15, wherein the fabric is a non-crimp fabric, the fibres are generally straight, and the fibres are arranged in generally parallel bundles, or wherein the fabric is a woven fabric.

17. The material of claim 15, wherein the pieces are substantially parallelogram, rectangular, square or hexagon in shape.

18. The material of claim 15, wherein each of the pieces has a length of approximately 100 mm and a width of approximately 100 mm.

19. The material of claim 15, wherein the pieces abut each other.

20. The material of claim 15, wherein the pieces are arranged on the veil in a grid pattern.

21. The method of claim 1, wherein each piece has a pair of opposite longitudinal sides extending parallel to the first axis and a pair of opposite latitudinal sides extending parallel to the second axis.

22. The method of claim 1, wherein said placing the pieces adjacent to each other comprises placing each piece so that at least one of the longitudinal sides is side-by-side with the longitudinal side of an adjacent one of the pieces in a respective one of the second rows and placing each piece so that at least one of the latitudinal sides is side-by-side with the latitudinal side of an adjacent one of the pieces in a respective one of the first rows.

23. The method of claim 1, wherein the first rows comprise three first rows and the second rows comprise three second rows.

* * * * *